(12) United States Patent
Jones et al.

(10) Patent No.: US 8,565,902 B2
(45) Date of Patent: Oct. 22, 2013

(54) SYSTEMS AND METHODS FOR CONTROLLING A BUILDING MANAGEMENT SYSTEM

(75) Inventors: Bryan Jones, Kariong (AU); Mark Cherry, Lakeville, MN (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 12/891,473

(22) Filed: Sep. 27, 2010

(65) Prior Publication Data

US 2011/0077754 A1 Mar. 31, 2011

(30) Foreign Application Priority Data

Sep. 29, 2009 (AU) .................................. 2009904741

(51) Int. Cl.
*G05B 15/02* (2006.01)

(52) U.S. Cl.
USPC .............................................. 700/9; 700/275

(58) Field of Classification Search
USPC .................................... 700/2, 9, 90, 275, 276
See application file for complete search history.

(56) References Cited

U.S. PATENT DOCUMENTS

| | | | |
|---|---|---|---|
| 6,816,878 B1 | 11/2004 | Zimmers et al. | |
| 7,280,030 B1 | 10/2007 | Monaco | |
| 7,626,507 B2 | 12/2009 | LaCasse | |
| 7,714,733 B2 | 5/2010 | Farley et al. | |
| 2001/0027388 A1 | 10/2001 | Beverina | |
| 2002/0112179 A1 | 8/2002 | Riordan | |
| 2003/0171851 A1 | 9/2003 | Brickfield et al. | |
| 2004/0058637 A1 | 3/2004 | Laiti | |
| 2004/0064260 A1 | 4/2004 | Padmanabhan et al. | |
| 2007/0016955 A1 | 1/2007 | Goldberg | |
| 2007/0109114 A1 | 5/2007 | Farley et al. | |
| 2007/0122003 A1* | 5/2007 | Dobkin et al. | ................ 382/115 |
| 2008/0036593 A1 | 2/2008 | Rose-Pehrsson et al. | |
| 2008/0144885 A1 | 6/2008 | Zucherman et al. | |
| 2008/0198231 A1 | 8/2008 | Ozdemir | |

(Continued)

FOREIGN PATENT DOCUMENTS

| | | |
|---|---|---|
| CA | 2538139 A1 | 3/2005 |
| EP | 1669912 B1 | 10/2010 |

(Continued)

OTHER PUBLICATIONS

Ritter et al., "Access Control in BACnet", ASHRAE Journal vol. 48, Nov. 2006.*

(Continued)

*Primary Examiner* — Carlos Ortiz Rodriguez
(74) *Attorney, Agent, or Firm* — Seager Tufe & Wickhem LLC (57) ABSTRACT

A method and apparatus, often implemented in a building management system, may include receiving data indicative of a threat level identifier, and subsequently receiving a user instruction to associate one or more sets of building system configuration data with the threat level identifier. Each set of building system configuration data may relate to a respective building system. The instruction may be processed to selectively associate the one or more sets of building system configuration data with the threat level identifier. Subsequently, in response to an instruction to implement a threat level corresponding to the threat level identifier, signals may be generated and transmitted thereby to instruct the relevant building systems to apply configuration data corresponding to the one or more data sets associated with the threat level identifier.

14 Claims, 6 Drawing Sheets

(56) References Cited

U.S. PATENT DOCUMENTS

| | | |
|---|---|---|
| 2008/0224862 A1 | 9/2008 | Cirker |
| 2008/0320552 A1 | 12/2008 | Kumar et al. |
| 2009/0157744 A1 | 6/2009 | McConnell |
| 2009/0160673 A1 | 6/2009 | Cirker |
| 2010/0048167 A1 | 2/2010 | Chow et al. |
| 2010/0156628 A1 | 6/2010 | Ainsbury et al. |
| 2010/0156630 A1 | 6/2010 | Ainsbury |

FOREIGN PATENT DOCUMENTS

| | | |
|---|---|---|
| WO | 2004029518 A9 | 5/2004 |
| WO | 2005045715 A2 | 5/2005 |
| WO | 2008157755 A1 | 12/2008 |
| WO | 2009079648 A1 | 6/2009 |
| WO | 2010106474 A1 | 9/2010 |

OTHER PUBLICATIONS

Hitchcock et al., "Improving Performance of HVAC Systems to Reduce Exposure to Aerosolized Infectious Agents in Buildings; Recommendations to Reduce Risks Posed by Biological Attcaks", Biosecurity and Bioterrorism: Biodefense strategy, Practice, and Science, Mary Ann Liebert, Inc., vol. 4, No. 1, 2006.*

* cited by examiner

SYSTEMS AND METHODS FOR CONTROLLING A BUILDING MANAGEMENT SYSTEM

This application claims the benefit of Australian Provisional Patent Application No. 2009904741, filed Sep. 29, 2009, and entitled "SYSTEMS AND METHODS FOR CONTROLLING A BUILDING MANAGEMENT SYSTEM," which is hereby incorporated by reference.

FIELD OF THE INVENTION

The present invention relates to building management, and more particularly to systems and methods for controlling a building management system. In particular, some embodiments include building management systems themselves, and/or components for controlling (for example modifying the operation of) an existing building management system.

Embodiments of the invention have been particularly developed for allowing the efficient implementation of a threat level across a building environment, particularly in terms of security, fire, HVAC, and other systems. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

Buildings include a complex collection of controllable systems, such as security, HVAC, fire, elevators, and the like. Building management systems have been developed for assisting in the management of such controllable systems, allowing a user to identify and deal with faults, apply scheduling parameters, and so on. However, the complexity of building management systems often renders them unable to adequately cope with sudden drastic changes.

It follows that there is a need in the art for improved systems and methods for managing building management systems.

SUMMARY

It is an object of the present invention to overcome or ameliorate at least one of the disadvantages of the prior art, or to provide a useful alternative.

One embodiment provides a method for controlling a building management system, the method including;
  receiving data indicative of a threat level identifier;
  receiving a user instruction to associate one or more sets of building system configuration data with the threat level identifier, wherein each set of building system configuration data relates to a respective building system; and
  processing the instruction, thereby to selectively associate the one or more sets of building system configuration data with the threat level identifier;
  such that, in response to an instruction to implement a threat level corresponding to the threat level identifier, signals are generated and transmitted thereby to instruct the relevant building systems to apply configuration data corresponding to the one or more data sets associated with the threat level identifier.

One embodiment provides a method including:
  receiving an instruction to implement a threat level corresponding to the threat level identifier; and
  in response to the instruction, defining data indicative of signals for instructing the relevant building systems to apply configuration data corresponding to the one or more data sets associated with the threat level identifier.

One embodiment provides a method including transmitted the signals to the relevant building systems such that those systems apply configuration data corresponding to the one or more data sets associated with the threat level identifier.

One embodiment provides a method wherein at least one of the signals is adapted for providing new configuration data to a building system.

One embodiment provides a method wherein at least one of the signals is adapted for instructing a building system to apply a set of configuration data maintained by that building system.

One embodiment provides a method a user is able to define a set of configuration data for any building system defined in a building management system.

One embodiment provides a method wherein the building systems include one or more building system defined in a building management system.

One embodiment provides a method wherein the building systems include at least two of the following:
  an HVAC control system, or one or more HVAC components;
  a security system, or one or more security system components;
  an emergency management system, or one or more emergency management system components;
  a lighting system, or one or more lighting system components; and
  a conveyance system, or one or more conveyance system components.

One embodiment provides a method for controlling a building management system, the method including;
  maintaining data indicative of a plurality of threat level identifiers, wherein each threat level identifier is associated with plurality of sets of building system configuration data, wherein each set relates to a respective building system;
  receiving an instruction to implement a threat level corresponding to the threat level identifier; and
  in response to the instruction, defining data indicative of signals for instructing the relevant building systems to apply configuration data corresponding to the one or more data sets associated with the threat level identifier.

One embodiment provides a method including transmitted the signals to the relevant building systems such that those systems apply configuration data corresponding to the one or more data sets associated with the threat level identifier.

One embodiment provides a hardware component configured device configured to perform a method as described herein.

One embodiment provides a computer program product configured device configured to perform a method as described herein.

One embodiment provides a carrier medium carrying computer executable code that, when executed on one or more processors, cause the performance of a method as described herein.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for controlling a building management system (BMS). The present embodiments are directed towards systems and methods that allow a user to implement threat levels in the context of a BMS. In broad terms, aspects of the technology described herein allow a user to define sets of configuration data for various building systems, and associate those sets of data with threat levels. In response to a change in conditions, a user selectively implements a different threat level, which causes the relevant configuration data to be applied to the various building systems. One embodiment provides a method, implemented in a computer system, including receiving data indicative of a threat level identifier, and subsequently receiving a user instruction to associate one or more sets of building system configuration data with the threat level identifier. Each set of building system configuration data relates to a respective building system. The method further includes processing the instruction, thereby to selectively associate the one or more sets of building system configuration data with the threat level identifier. Subsequently, in response to an instruction to implement a threat level corresponding to the threat level identifier, signals are generated and transmitted thereby to instruct the relevant building systems to apply configuration data corresponding to the one or more data sets associated with the threat level identifier.

Introduction to Threat Levels

Embodiments are described below by reference to situations where sets of configuration data are associated with "threat levels". The term "threat level" is used to describe a high-level situational assessment, for example based around security concerns. In some embodiments the threat levels defined for a given implementation correspond (precisely or loosely) to threat levels defined for an independent system. For example, the US Department of Homeland Security implements a "threat level" system via their Homeland Security Advisory System. This system uses the following criteria:

Severe (red): severe risk.
High (orange): high risk.
Elevated (yellow): significant risk.
Guarded (blue): general risk.
Low (green): low risk.

In general terms, the Homeland Security Advisory System is a color-coded terrorism threat advisory scale. The different levels trigger specific actions by federal agencies and state and local governments, and they affect the level of security at some airports and other public facilities. In this regard, there is often a link between the threat level and the manner in which a BMS should operate. For example, an escalation in threat levels might have a practical consequence in that greater access control scrutiny is applied, surveillance equipment set to record more data, and HVAC equipment to be operated in a different mode.

Different threat level systems are used in other jurisdictions and/or for other purposes, including UK Threat Levels, and Vigipirate in France. The present disclosure should not be limited to any such system in isolation, and the use of the term "threat level" is descriptive only, relating to the general concept of a tiered system whereby security and/or other situational characteristics are categorized at a high-level and in an objective manner. Although in some cases threat levels used in the context of a BMS correspond to threat levels applied by a centralized body, in other cases the threat levels are user defined, and independent of any centralized threat level regime.

The present embodiments are directed towards systems and methods that allow a user to implement threat levels in the context of a building management system (BMS). In broad terms, aspects of the technology described herein allow a user to define sets of configuration data for various building systems, and associate those sets of data with threat levels. In response to a change in conditions, a user selectively applies different threat level, which causes the relevant configuration data to be applied at the various building systems.

System Level Overview

Figure 1:
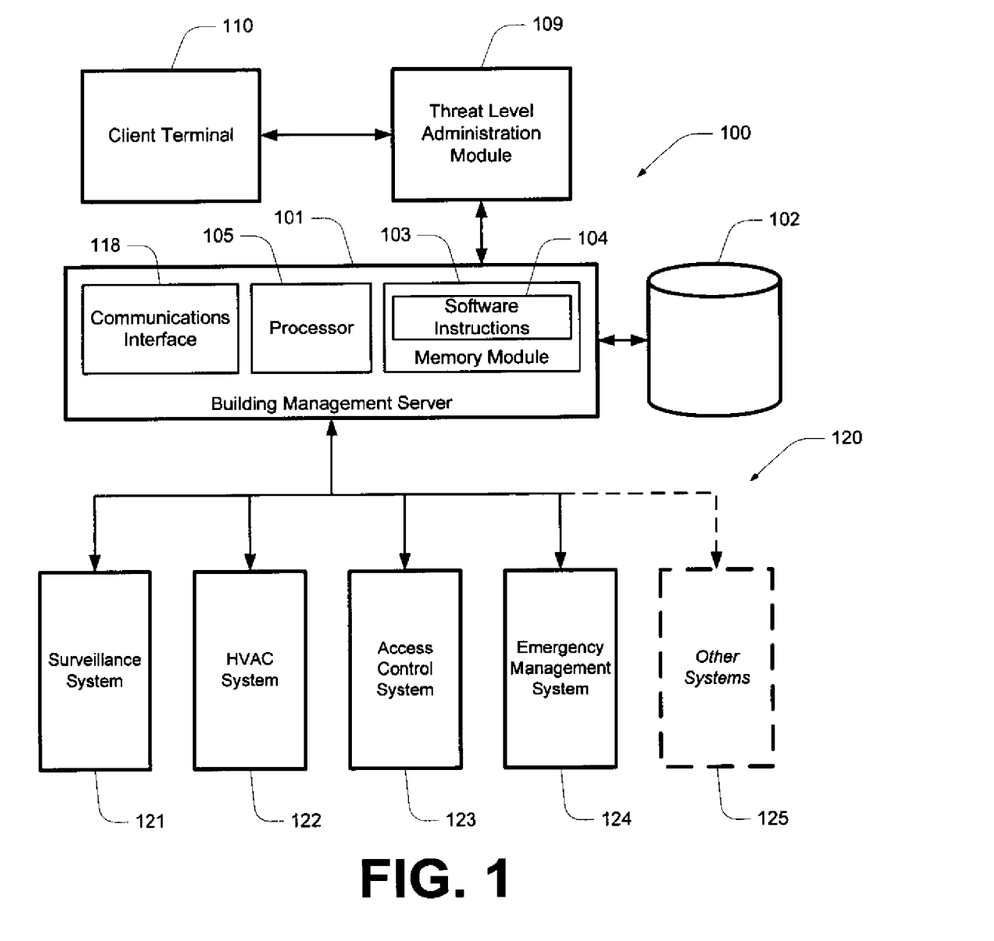
FIG. 1 schematically illustrates a system according to one embodiment.

FIG. 1 illustrates a building management system (BMS) 100 according to one embodiment. BMS 100 is defined by both hardware and software components. For example, BMS 100 includes a central BMS server 101 which operates in conjunction with a database 102. Server 101 includes a memory module 103 which maintains software instructions 104 executable on a processor 105, thereby to allow the server to perform various functionalities. For example, these software instructions define some or all of a computer program product in the form of a BMS software application.

Although FIG. 1 illustrates server 101 as a single component, in some embodiments server 101 is defined by a plurality of distributed hardware and/or software components.

In the present embodiment software instructions 104 allow server 101 to provide a threat level administration module 109. This is a software component which provides a user with access to threat level management functionalities in the context of BMS 100. Although the present embodiments describe module 109 as being integrated with a BMS software application, in other embodiments it is an independent component (for example a third party application or add-in, hosted by or other than by server 101). In the present embodiment, a user interacts with module 109 via a client terminal 110. For example, module 109 is presented as a web-based interface by server 101, and a user of client terminal 110 accesses this interface using a web-browser application. In other embodiments proprietary software is locally installed at client terminal 110.

BMS 101 includes communication interfaces 118 (such as Ethernet and other interfaces) for enabling communication with a plurality of controllable building systems 120. The nature of systems 120 vary between embodiments, depending on the configuration of BMS 100 and more particularly server 101. However, generally speaking, BMS technology is primarily applied in respect of HVAC, and commonly linked with security, fire, and other such building systems. In the context of FIG. 1, systems 120 include:

- A surveillance system 121. For example, this may be a DVM system including a cameras, camera servers, administration servers, and so on.
- A HVAC system 122. For example, this may include a plurality of controllable HVAC components, such as boilers, fans, and so on.
- An access control system 123. For example, this may include access control devices (e.g. card readers coupled to door locking mechanisms), and components for managing the operation of such devices.
- An emergency management system 124, which may include one or more components related to fire management, evacuation alarms, and so on.

Other systems 125, which may include conveyance systems (such as lifts or elevators) lighting systems (such as one or more controllable lighting controllers) and so on. Generally speaking, the present disclosure should not be limited in terms of any particular building systems, as the technology described is extensible in the context of a given BMS to operate with whatever various building systems are present.

The term "building system" in some cases refers to an integrated system for managing a plurality of components, such as a DVM system including a plurality of cameras and camera servers. In such cases, the BMS communicates with the system in a centralized manner, by communicating with one or more central control components (e.g. administration servers) rather than the individual devices. In other cases, the term "building system" refers to a distributed set of individual components, and the BMS communicates with those components on an individual level.

Configuration of Threat Levels

Figure 2:
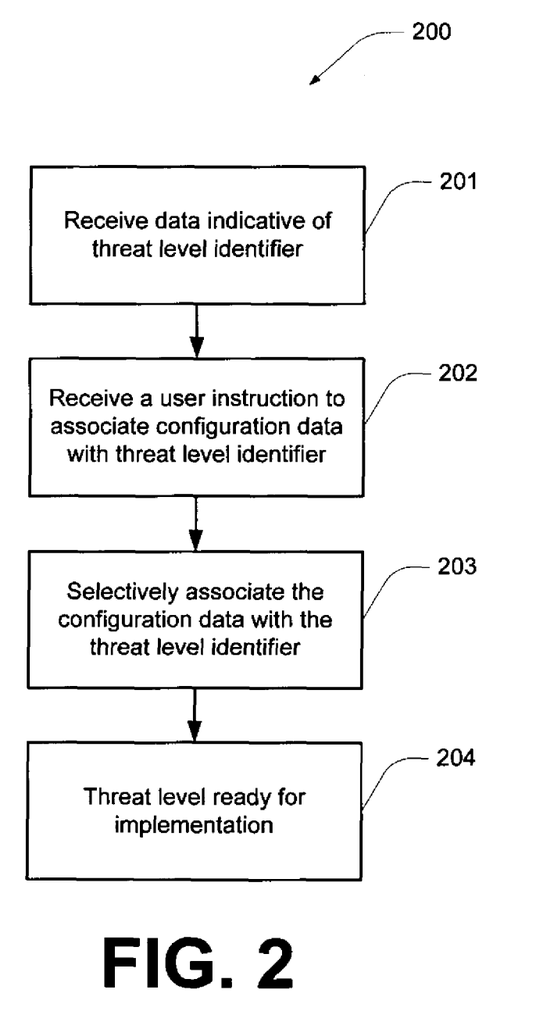
FIG. 2 illustrates a method according to one embodiment.

FIG. 2 illustrates a method 200 for configuring threat levels according to one embodiment. Method 200 includes, at 201, receiving data indicative of a threat level identifier. The manner in which this occurs varies between embodiments, and depending on context. In general terms, each threat level defined for the purposes of system 100 has an assigned threat level identifier, which is used in the context of an information system (e.g. a database) for identifying that threat level. The threat level may be represented on screen via a graphical user interface (GUI) by various means, including icons, text, and the like. In some cases 201 includes a process whereby a user interacts with a GUI and selects a pre-existing threat level, and this selection results in data indicative of the threat level identifier for the selected threat level. In other cases the data is received in the sense that a new threat level identifier is defined for a new threat level.

A user instruction is received at 202, this instruction being indicative of a command to associate configuration data with the threat level identifier. That is, in simple terms, the user instructs system 100 (or, more specifically, module 109) to associate one or more sets of building system configuration data with the threat level (or, in the context of system 100, with the threat level identifier). Each set of building system configuration data relates to a respective building system.

The instruction received at 202 is processed and selectively implemented at 203. For example, in some cases the implementation is "selective" in the sense that a logical process is followed to determined whether or not the instructions is appropriate for implementation. This is optionally based on a set of rules governing the nature and makeup of configuration data, thereby to ensure that configuration data to be applied is not inherently flawed. In the case that the instruction is implemented, the configuration data is associated with the threat level identifier in database 102, thereby to leave the threat level in question ready for implementation at 204.

Figure 3:
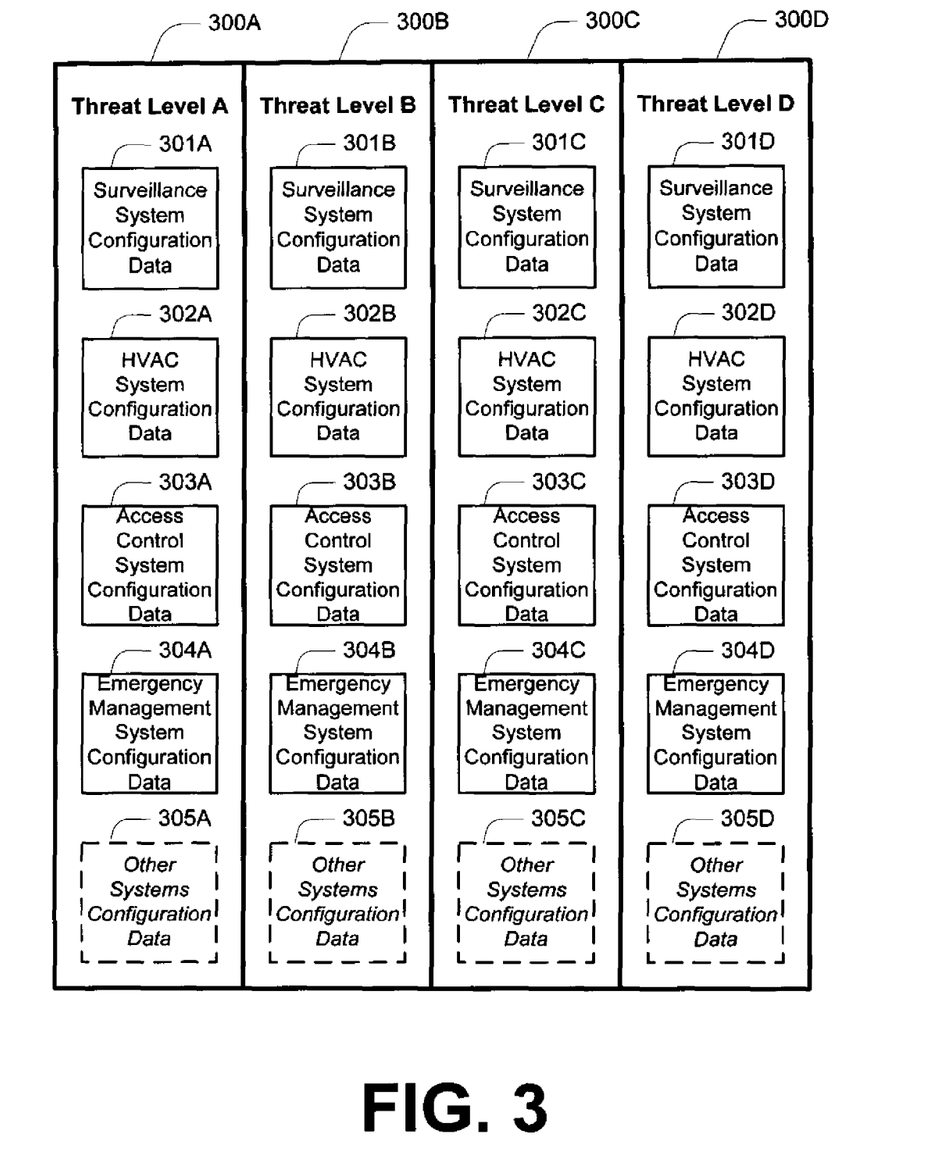
FIG. 3 illustrates threat level sorted configuration data according to one embodiment.

FIG. 3 provides a schematic graphical representation of how threat levels are maintained in database 102. In this diagram, four threat levels are illustrated, and designated reference numerals 300A to 300D. Each threat level includes respective surveillance system configuration data (301A to 301D), HVAC system configuration data (302A to 302D), access control system configuration data (303A to 303D), emergency management system configuration data (304A to 304D), and other system configuration data (305A to 305D). In this regard, each threat level 300A to 300D includes a full set of configuration data for its systems, and in this manner includes across-the-board configuration data for system 100.

Figure 4:
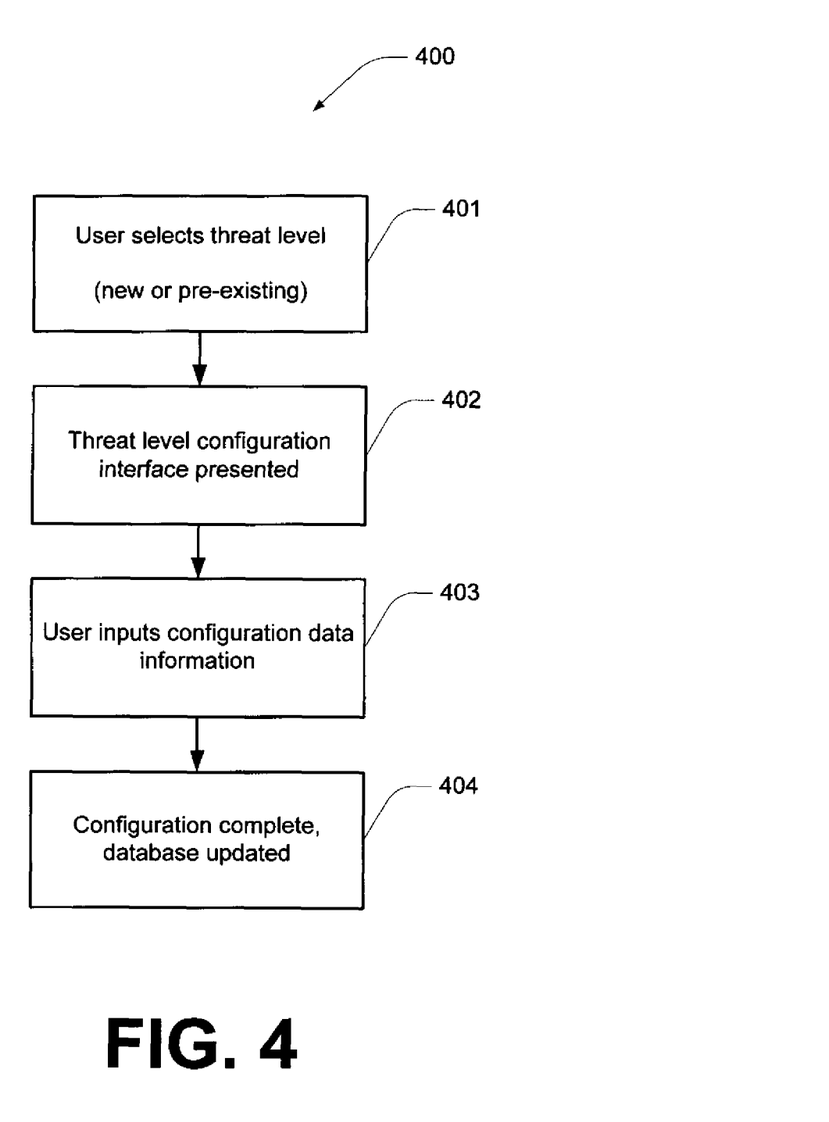
FIG. 4 illustrates a method according to one embodiment.

The manner by which the individual sets of configuration data are defined varies between embodiments, depending on the nature of system in question, and matters of design choice/implementation. A general example is provided in FIG. 4, which illustrates a method 400. At 401, a user selects a threat level for configuration. This may either be a new threat level (i.e. the user selects an option to create a new threat level) or an existing threat level (i.e. the user selects an option to modify an existing threat level). At 402 the user is presented with a threat level configuration interface, and the user inputs configuration data into this interface at 403. For example, in one embodiment this interface guides the user through a process whereby configuration data is able to be inputted for a plurality of subsystems and/or components. This is optionally based on information maintained about the available building systems and their respective configurable parameters. The database is updated at 404 once configuration is completed.

Implementation of Threat Levels

Figure 5:
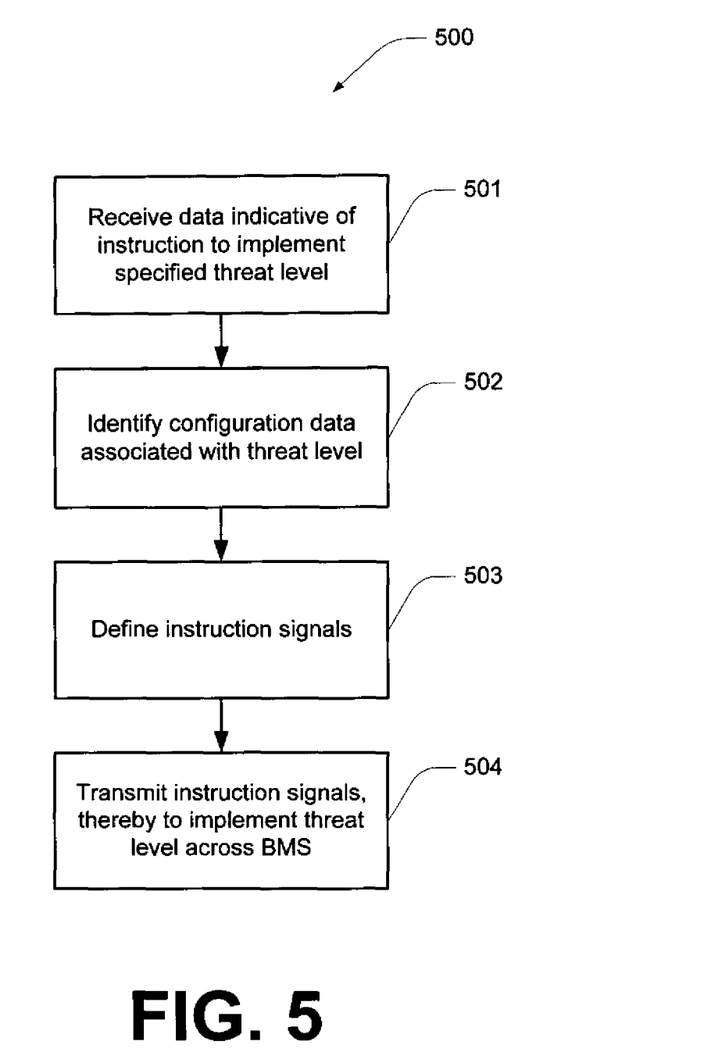
FIG. 5 illustrates a method according to one embodiment.

FIG. 5 illustrates an exemplary method 500 for implementing a threat level in a BMS. In overview, this method is performed following an instruction to implement a given threat level across a BMS, based on the configuration of threat levels as discussed above.

Method 500 includes, at 501, receiving data indicative of an instruction to implement a specified threat level. This instruction may originate from a user of a client terminal (and for the present purpose it is assumed that the user has appropriate authorization to provide such an instruction). In some cases the instruction originates from an automated source, such as a module that receives data from a centralized threat level administration system, or an automated process that is responsive to predetermined events in a BMS (such as an event triggered in a surveillance system) for automatically triggering a change in threat level.

The method further includes, at 502, identifying configuration data associated with the threat level specified in the instruction received at 501. For example, in some embodiments a database associates a threat level data with a reference to configuration data. This configuration data may be maintained at a BMS server, or at individual devices (as discussed further below). Then, at 503, instruction signals are defined for implementing the threat level, these instructions being transmitted at 504. The transmission of these instructions implements the threat level across the BMS.

There are various ways in which 502 to 504 are performed in practice. For example:

In some cases a threat level is associated with configuration data that is downloadable to a building system control device (or individual devices in that system). Once downloaded and applied, the building system control device (or individual devices in that system) adopts the desired configuration. This may affect the likes of scheduling, decision making, access control management, and other behaviors.

In some cases a threat level is associated with configuration data already maintained at a building system control device (or individual devices in that system). For example, Australian Patent Application No. 2009901185 describes approaches whereby multiple sets of configuration data are maintained on individual devices, primarily access control devices. A threat level can be implemented across such devices by way of an instruction to adopt a specific one of those sets.

In some cases a threat level is associated with a set of commands (and optionally logic for implementing those commands) thereby to progress a building system control device (or individual devices in that system) from their current operational state into another operational state. For example, a given set of configuration data for an elevator might specify that the system should be shut down. The set of configuration data may therefore be indicative of instructions or instruction signals that should be communicated thereby to shut down that elevator.

The general crux is that the BMS maintains sufficient information to apply the configuration data in respect of a given threat level at a system-wide level.

Exemplary Arrangement

Figure 6:
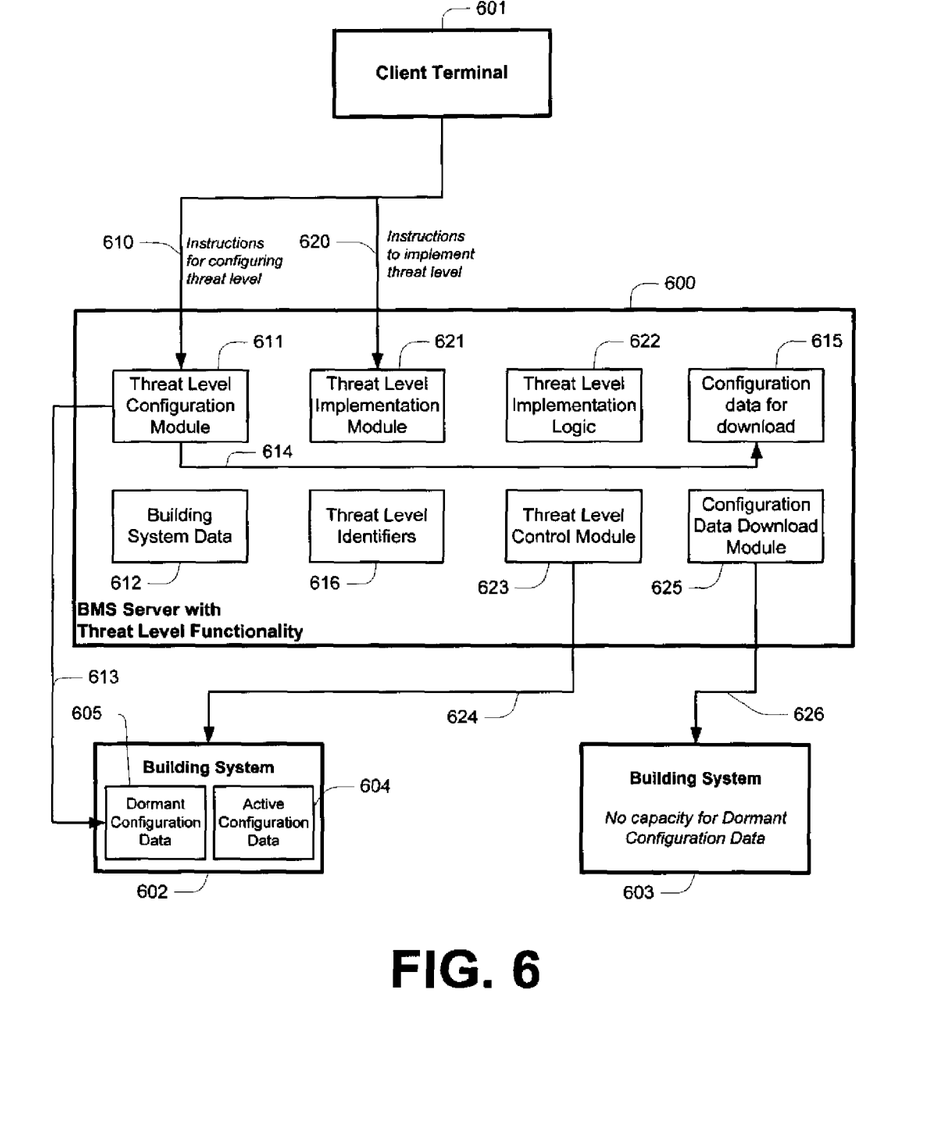
FIG. 6 illustrates a system according to one embodiment.

FIG. 6 illustrates an exemplary arrangement according to one embodiment. This embodiment is framed around a BMS server 600, this server having threat level management functionality. Various components associated with that threat level functionality are illustrated. Other components (such as standard BMS components) are omitted for the sake of simplicity. Furthermore, it should be appreciated that these components are functionally distinguished, and need not be discrete components at a practical level.

At a general level, server 600 interacts with a client terminal 601. Furthermore, server 600 is in communication with a plurality of building systems, of which two exemplary building systems 602 and 603 are shown. Building system 602 locally maintains active configuration data 604 and dormant configuration data 605. This is similar to the approach described in Australian Patent Application No. 2009901185, which deals with access control device configured to maintain multiple sets of configuration data for the purposes of threat level functionalities.

In use, client terminal 601 provides instructions 610 to a threat level configuration module 611. These instructions are provided for the purposes of configuring threat levels for the BMS. Module 611 operates in conjunction with a repository of building system data 612. Data 612 provides guidelines to the process of configuring threat levels, for example in terms of describing the categories and configuration requirements of available building systems. The process of providing instructions 610 may include uploading configuration data for the building systems, and/or defining configuration data for those systems via an interactive process provided by module 611.

Once defined, sets of configuration data are stored for subsequent implementation. In the case of building system 602, module 611 provides the relevant set of configuration data to system 602 via a signal 613, and that configuration data is stored in dormant configuration data 605. In the case of building system 603, the configuration data is stored at BMS server 600 as configuration data for download 615. In either case, the configuration data is associated with its associated threat level identifier at module 616.

Upon a desire to implement a threat level, client terminal 601 provides an instruction 620 to a threat level implementation module 621. This instruction is indicative of the desired threat level. Module 621 processes this instruction to ensure that various predefined conditions are met (for example that the user responsible for the instruction is appropriately authorized). In the case that the conditions are met, module 621 coordinates the implementation of the threat level based on threat level implementation logic 622. In the case of building system 602, this includes instructing a threat level configuration module 623 to provide an instruction 623 to system 602, thereby to cause system 602 to implement a set of dormant configuration data 605 corresponding to the threat level from instruction 620. In this manner, system 602 adopts the desired threat level. In the case of building system 603, a configuration module data download module 623 provides signals 626 to system 603, these signals resulting in the download of configuration data 615 to system 603. This configuration data is applied by system 603, thereby to configure that system to operate within the scope of the desired threat level.

CONCLUSIONS AND INTERPRETATION

It will be appreciated that the above disclosure provides various systems and methods for controlling a building management system. In particular, the centralized definition of threat levels and associated configuration data allows for a system-wide shift in operation to be achieved by way of a single command.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A processor-implemented method for controlling a building management system, wherein the building management system includes a plurality of building systems, wherein each building system functions on the basis of a respective set of currently applied configuration data, the method comprising:
    maintaining data indicative of a plurality of threat level identifiers;
    enabling a user to associate sets of building system configuration data with the threat level identifiers, wherein each set of building system configuration data relates to a respective building system, such that for a given one of the building systems, there are a plurality of sets of configuration data each associated with a respective one of the threat level identifiers, including a currently applied set of configuration data and at least one non-applied set of configuration data;
    receiving an instruction to implement a threat level defined by a specified one of the threat level identifiers;
    identifying the sets of configuration data associated with the specified one of the threat level identifiers; and
    for each of the sets of configuration data associated with the specified one of the threat level identifiers:
        (i) determining the building system to which the set of configuration data relates; and
        (ii) instructing the building system to which the set of configuration data relates to apply the set of configuration data as its currently applied configuration data.

2. A method according to claim 1 wherein, for one of the sets of configuration data associated with the specified one of the threat level identifiers, the method includes communicating, to the building system to which that set of configuration data relates, code embodying that one of the sets of configuration data.

3. A method according to claim 1 wherein at least one of the building systems maintains in a local memory device data indicative of the set of currently applied configuration data and data indicative of one or more non-applied set of configuration data.

4. A method according to claim 1 wherein a user is able to define a set of configuration data for any building system defined in a building management system.

5. A method according to claim 1 wherein the building systems include one or more building systems defined in a building management system.

6. A method according to claim 1 wherein the building systems include at least two of the following categories:
    category 1: an HVAC control system, or one or more HVAC components;
    category 2: a security system, or one or more security system components;
    category 3: an emergency management system, or one or more emergency management system components;
    category 4: a lighting system, or one or more lighting system components; and
    category 5: a conveyance system, or one or more conveyance system components.

7. A non-transitory computer readable medium containing code that, when executed on one or more processors, causes the processors to perform a method according to claim 1.

8. A processor-implemented method for controlling a building management system, wherein the building management system includes a plurality of building systems, wherein each building system functions on the basis of a respective set of currently applied configuration data, the method comprising:
    maintaining data indicative of a plurality of threat level identifiers and associated sets of configuration data, wherein each set of building system configuration data relates to a respective building system, such that for a given one of the building systems, there are a plurality of sets of configuration data each associated with a respective one of the threat level identifiers, including a currently applied set of configuration data and at least one non-applied set of configuration data;
    receiving an instruction to implement a threat level defined by a specified one of the threat level identifiers;

identifying the sets of configuration data associated with the specified one of the threat level identifiers; and for each of the sets of configuration data associated with the specified one of the threat level identifiers:
(i) determining the building system to which the set of configuration data relates; and
(ii) instructing the building system to which the set of configuration data relates to apply the set of configuration data as its currently applied configuration data.

9. A non-transitory computer readable medium containing code that, when executed on one or more processors, causes the processors to perform a method according to claim 8.

10. A building management system includes a plurality of building systems, wherein each building system functions on the basis of a respective set of currently applied configuration data, the building management system comprising:

a memory for storing building system configuration data for each of the building systems, and for storing a plurality of threat level identifiers;

a controller coupled to the memory, the controller configured to:

allow a user to associate sets of building system configuration data with the threat level identifiers, wherein each set of building system configuration data relates to a respective building system, such that for a given one of the building systems, there are a plurality of sets of configuration data each associated with a respective one of the threat level identifiers, including a currently applied set of configuration data and at least one non-applied set of configuration data;

receive an instruction to implement a threat level defined by a specified one of the threat level identifiers, and once received, the controller identifying the sets of configuration data associated with the specified one of the threat level identifiers, and for each of the sets of configuration data associated with the specified one of the threat level identifiers, determine the building system to which the set of configuration data relates; and instruct the building system to which the set of configuration data relates to apply the set of configuration data as its currently applied configuration data.

11. The building management system of claim 10, wherein for one of the sets of configuration data associated with the specified one of the threat level identifiers, the controller communicates, to the building system to which that set of configuration data relates, code embodying that one of the sets of configuration data.

12. The building management system of claim 10, wherein at least one of the building systems maintains in a local memory device data indicative of the set of currently applied configuration data and data indicative of one or more non-applied set of configuration data.

13. The building management system of claim 10, wherein the controller allows a user to define, via a user interface, a set of configuration data for any building system defined in a building management system.

14. The building management system of claim 10, wherein the building systems include at least two of the following categories:

category 1: an HVAC control system, or one or more HVAC components;

category 2: a security system, or one or more security system components;

category 3: an emergency management system, or one or more emergency management system components;

category 4: a lighting system, or one or more lighting system components; and category 5: a conveyance system, or one or more conveyance system components.

\* \* \* \* \*